(12) United States Patent
Mochizuki

(10) Patent No.: US 8,390,853 B2
(45) Date of Patent: Mar. 5, 2013

(54) IMAGE PROCESSING SYSTEM FOR SUPPLYING SERVICES TO AN IMAGE PROCESSING DEVICE THROUGH A MANGEMENT SERVER

(75) Inventor: Takatoshi Mochizuki, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 900 days.

(21) Appl. No.: 12/504,958

(22) Filed: Jul. 17, 2009

(65) Prior Publication Data

US 2010/0073714 A1 Mar. 25, 2010

(30) Foreign Application Priority Data

Sep. 19, 2008 (JP) ................................. 2008-240942

(51) Int. Cl.
*G06F 3/12* (2006.01)
*G06K 15/00* (2006.01)
(52) U.S. Cl. ........................................ 358/1.15; 358/1.1
(58) Field of Classification Search .................... 358/1.1, 358/1.9, 1.12, 1.13, 1.14, 1.15, 1.18, 403, 358/404, 474, 400, 500; 709/201, 203, 219, 709/242; 707/609, 705; 382/305
See application file for complete search history.

(56) References Cited

U.S. PATENT DOCUMENTS

| | | | | |
|---|---|---|---|---|
| 7,827,482 | B2 * | 11/2010 | Satomi | 715/255 |
| 8,214,533 | B2 * | 7/2012 | Nishi | 709/249 |
| 2002/0087635 | A1 | 7/2002 | Yamaguchi et al. | |
| 2004/0066532 | A1 | 4/2004 | Matsugi | |
| 2004/0098320 | A1 * | 5/2004 | Mitsuhashi et al. | 705/27 |
| 2006/0050300 | A1 * | 3/2006 | Mitani et al. | 358/1.15 |

FOREIGN PATENT DOCUMENTS

| | | |
|---|---|---|
| JP | 11-096118 | 4/1999 |
| JP | 2000-163330 | 6/2000 |
| JP | 2002-92135 | 3/2002 |
| JP | 2002-169735 | 6/2002 |
| JP | 2004-80744 | 3/2004 |
| JP | 2004-199165 | 7/2004 |
| JP | 2005-151010 | 6/2005 |

OTHER PUBLICATIONS

Japanese Notification of Reasons for Refusal mailed Jul. 27, 2010, directed to corresponding Japanese Patent Application No. 2008-240942; 7 pages.

* cited by examiner

*Primary Examiner* — Gabriel Garcia
(74) *Attorney, Agent, or Firm* — Morrison & Foerster LLP

(57) ABSTRACT

An image processing system that can remove users' burden in implementing services by external devices. The image processing device includes the information receiver that receives a list of internal and external service identifiers each of which identifies a corresponding internal and external service, the reception unit that displays the list, receives a selection of an internal or external service identifier, and receives a designation of object image data, and the data transmitter that transmits the selected external service identifier and the designated object image data. The management server includes the information storage unit that stores the list, the information transmitter that transmits the list, the data receiver that receives the external service identifier and the object image data, and the requester that transmits the external service identifier and the object image data to the external device and requests to implement the external service identified by the external service identifier.

27 Claims, 13 Drawing Sheets

FIG.3

| Service name | Price | Connection information |
|---|---|---|
| Searchable PDF | 10 | 192.168.0.1;user1;pass1 |
| Tilt correction | 2 | -- |
| Special printing | 10 | 192.168.0.128;user2;pass2 |
| Normal printing | 5 | -- |
| File server archiving | 3 | 192.168.0.201;user21;pass21 |
| Format conversion | 1 | 192.168.0.202;user22;pass22 |
| Document management system archiving | 5 | 192.168.0.201;user21;pass21 |

FIG.7

| Service name | Price | Connection information | User |
|---|---|---|---|
| Searchable PDF | 10 | 192.168.0.1;user1;pass1 | User 1 ; User 2 ; User 3 |
| Tilt correction | 2 | — | User 1 ; User 2 ; User 3 |
| Special printing | 10 | 192.168.0.128;user2;pass2 | User 1 ; User 2 |
| Normal printing | 5 | — | User 1 ; User 2 ; User 3 |
| File server archiving | 3 | 192.168.0.201;user21;pass21 | User 1 ; User 2 ; User 3 |
| Format conversion | 1 | 192.168.0.202;user22;pass22 | User 2 |
| Document management system archiving | 5 | 192.168.0.201;user21;pass21 | User 1 |

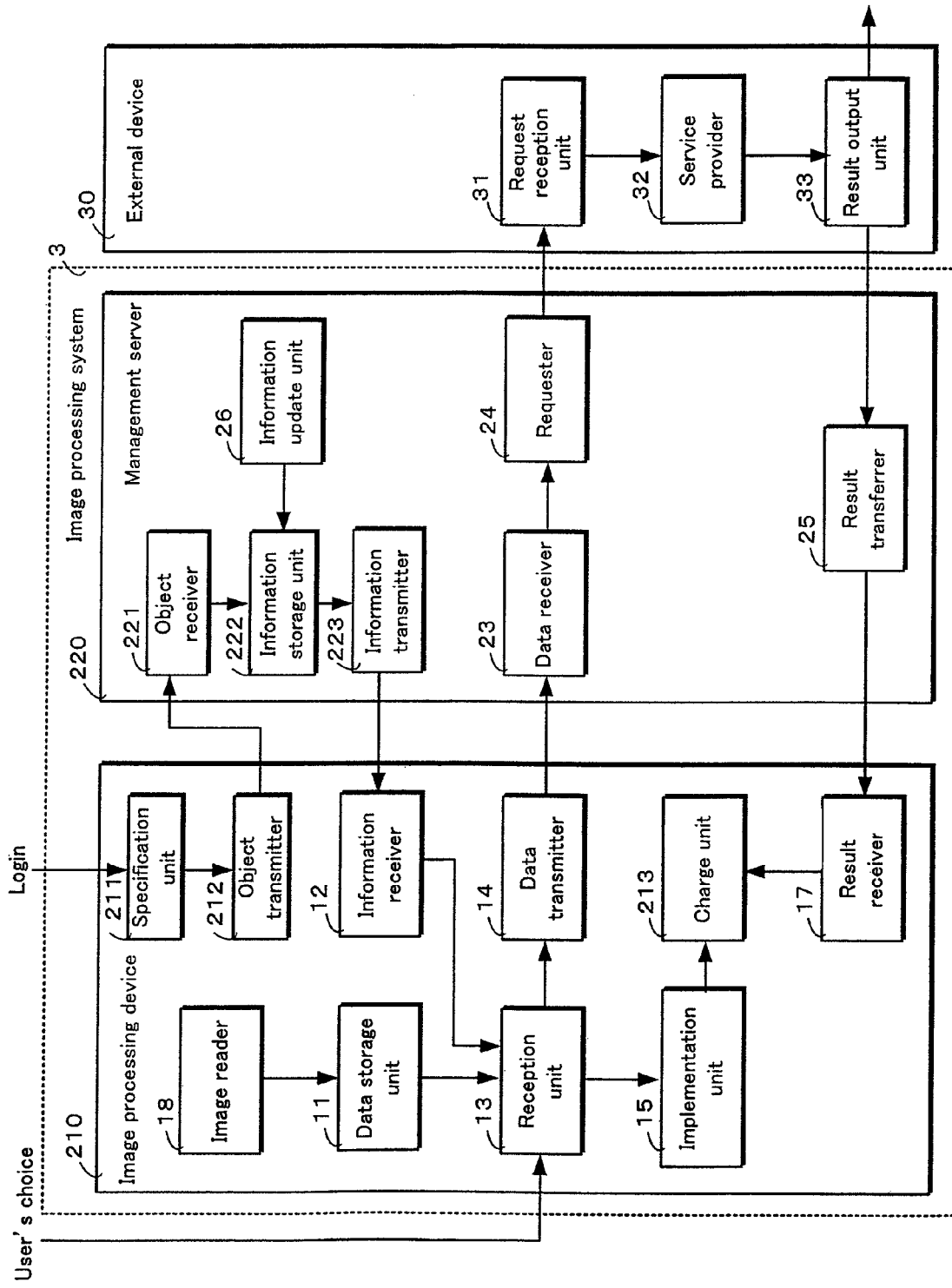

FIG.9

| Service name | Price | Connection information | Section |
|---|---|---|---|
| Searchable PDF | 10 | 192.168.0.1;user1;pass1 | Section 1 ; Section 2 ; Section 3 |
| Tilt correction | 2 | — | Section 1 ; Section 2 ; Section 3 |
| Special printing | 10 | 192.168.0.128;user2;pass2 | Section 1 ; Section 2 ; Section 3 |
| Normal Printing | 5 | — | All sections |
| File server archiving | 3 | 192.168.0.201;user21;pass21 | Section 1 ; Section 2 ; Section 3 |
| Format conversion | 1 | 192.168.0.202;user22;pass22 | Section 2 ; Section 3 |
| Document management system archiving | 5 | 192.168.0.201;user21;pass21 | Section 1 |

FIG.11

| Service name | Price | Connection information | Device ID |
|---|---|---|---|
| Searchable PDF | 10 | 192.168.0.1;user1;pass1 | Device A ; Device B ; Device C |
| Tilt correction | 2 | — | Device A ; Device B |
| Special printing | 10 | 192.168.0.128;user2;pass2 | Device A ; Device B ; Device C |
| Normal Printing | 5 | — | Device A ; Device C |
| File server archiving | 3 | 192.168.0.201;user21;pass21 | Device A ; Device B ; Device C |
| Format conversion | 1 | 192.168.0.202;user22;pass22 | Device A ; Device C |
| Document management system archiving | 5 | 192.168.0.201;user21;pass21 | Device B ; Device C |

FIG.13

| Service name | Price | Connection information | Available time |
|---|---|---|---|
| Searchable PDF | 10 | 192.168.0.1;user1;pass1 | 10:00-17:00 |
| Tilt correction | 2 | — | 0:00-24:00 |
| Special printing | 10 | 192.168.0.128;user2;pass2 | 6:00-22:00 |
| Normal Printing | 5 | — | 0:00-24:00 |
| File server archiving | 3 | 192.168.0.201;user21;pass21 | 8:00-22:00 |
| Format conversion | 1 | 192.168.0.202;user22;pass22 | 0:00-24:00 |
| Document management system archiving | 5 | 192.168.0.201;user21;pass21 | 1:00-6:00/8:00-22:00 |

IMAGE PROCESSING SYSTEM FOR SUPPLYING SERVICES TO AN IMAGE PROCESSING DEVICE THROUGH A MANGEMENT SERVER

CROSS-REFERENCE TO RELATED APPLICATION

This application is based on application No. 2008-240942 filed in Japan, the contents of which are hereby incorporated by reference.

BACKGROUND OF THE INVENTION (1) Field of the Invention

The present invention relates to an image processing system managing uses of image processing services and usage fees therefor, and especially to a technique for improving users' convenience when an external device implements the services that are difficult for an image processing device to provide users.

(2) Description of the Related Art

In general, usage fees of image processing devices, such as MFP (Multi Functional Peripherals), having an image forming function, are charged for each use of service such as printing and copying. Alternatively, the usage fees are periodically charged each person or section which uses the service during a predetermined time period.

On the other hand, in the case of using functionally high grade services, such as searchable PDF (Potable Document Format), or special services such as mass rapid printing and high-definition printing, which are not available in an image processing device, utilization of an external device is requested to implement these services. In this case, users are asked to sign contracts with each service supplier and pay for usage fees respectively to each service supplier. It is extremely bothersome and inconvenient for the users.

As a conventional technology, for example, patent document 1 (Japanese Patent Application Publication NO. 11-96118) discloses a network device which consolidatedly manages charge information of a plurality of machines with multiple functions by utilizing a server. According to the conventional technology, even if the number of image processing devices changes, the network device can easily manage each user's charge information in the whole system. That is, the network device efficiently identifies the user who uses each image processing device and calculates the usage fee of each image processing device (paragraph 0091).

However, the technology disclosed in the document can not remove the above-mentioned bother of signing contracts with each service supplier or the inconvenience of paying the suppliers for usage fees respectively, because it does not relate to the service that are requested to an external device.

In addition, it is also inconvenient for users to pay usage fees for the services such as printing and copying that can be implemented by the internal image processing device itself, separately from the usage fees being paid to the suppliers. This inconvenience cannot be removed if the contracts and the usage fees for the services requested to external devices are consolidatedly managed.

SUMMARY OF THE INVENTION

An object of the present invention is therefore to provide an image processing system, an image processing method, a management server, an image processing device, a management program and an image processing program which make it possible to remove users' burden and improve users' convenience when services, which are not available for an internal image processing device and to be implemented by an external device.

One of the aspects of the present invention to achieve the above-mentioned object is to provide an image processing system comprising an image processing device and a management server, the image processing device including: an information receiver operable to receive, from the management server, a list of service identifiers each of which identifies a corresponding image processing service which is not available in the image processing device and to be implemented by an external device; a reception unit operable to (i) display the received list, and (ii) receive, from a user, a selection of a service identifier from the list, and a designation of object image data to be used for the image processing service identified by the selected service identifier, and (iii) obtain the designated object image data; a data transmitter operable to transmit the selected service identifier and the designated object image data to the management server, and the management server including: an information storage unit storing the list; an information transmitter operable to transmit the list to the image processing device; a data receiver operable to receive the service identifier and the object image data transmitted from the image processing device; and a requester operable to transmit the received object image data and the received service identifier to the external device, and request to implement the image processing service identified by the received service identifier.

With the above-stated structure, the above-stated aspect of the present invention provides, the advantageous effect that it can remove the burden for each user of signing contracts with each service supplier and the like, because external image processing services are managed by a management server. That is, the supply of the service used at an image processing device is mediated by the management server.

BRIEF DESCRIPTION OF THE DRAWINGS

These and the other objects, advantages and features of the invention will become apparent from the following description thereof taken in conjunction with the accompanying drawings which illustrate a specific Embodiment of the invention. In the drawings:

FIG. 3 shows one example of a table indicating list information and pieces of fee information stored in an information storage unit 21;

FIG. 7 shows one example of a table indicating list information and pieces of fee information stored in an information storage unit 122;

FIG. 8 shows a basic functional configuration of an image processing device 210, a management server 220, and the external device 30 in Modification 2;

FIG. 9 shows one example of a table indicating list information and pieces of fee information stored in an information storage unit 222;

FIG. 11 shows one example of a table indicating list information and pieces of fee information stored in an information storage unit 322;

FIG. 13 shows one example of a table indicating list information and pieces of fee information stored in an information storage unit 421.

DESCRIPTION OF THE PREFERRED EMBODIMENT

Embodiment 1

<<Outline>>

Embodiment 1 relates to an image processing system in which a management server (i) manages image processing services implemented by at least more than one external devices, and usage fees therefor, (ii) mediates to provide the image processing services which are used at an image processing device, and (iii) transmits latest pieces of fee information to each image processing device so that the usage fees for external services implemented by the external devices and the usage fees for internal services implemented by each image processing device can be charged together by each image processing device based on the latest pieces of fee information.

<<Configuration>>

Figure 1:
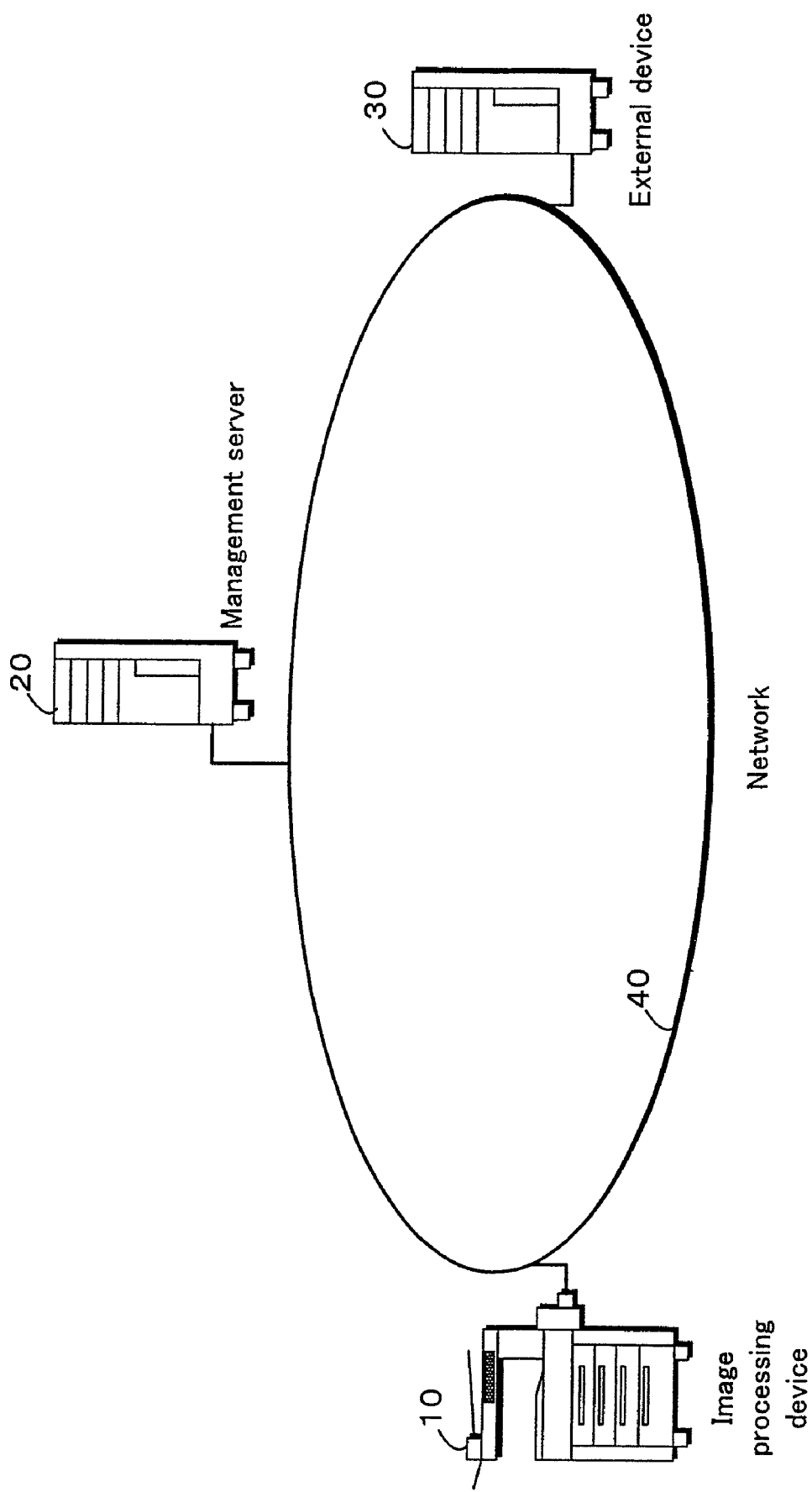
FIG. 1 is a diagrammatic illustration of an image processing system in Embodiment 1.

The following describes an image processing system in Embodiment 1, with reference to FIG. 1.

The image processing system 1 in Embodiment 1 includes an image processing device 10 and a management server 20. And the image processing device 10, the management server 20, and an external device 30 are connected to a network 40 which enables mutual communication among them.

The image processing device 10 is a machine with multiple functions such as copying, network printing, scanning, faxing, and document serving. Note that the system may include a plurality of image processing devices, although the above system includes only one image processing device to simplify the description.

The management server 20 is comprised of a computer and the like, and manages image processing services to be implemented by the external device 30 (hereinafter, each of the image processing services is referred to as "external service") and usage fees therefor.

The external device 30 is comprised of a kind of high-end computer and the like. Alternatively, it is comprised of a kind of printing system capable of implementing functionally high grade services such as searchable PDF, or special services such as mass rapid printing and high-definition printing, which are not available in the image processing device 10. The external device 30 receives, from the image processing device 10, a request for an external service and image data to be used for the external service through the management server 20. The management server 20 mediates the transmission of the request and the image data to the external device 30. And then the external device 30 implements the requested external service by using the received image data. The number of external devices which receive requests from the image processing device 10 is not limited to one. And also, it is possible to use a plurality of external devices each of which may implement the corresponding external service requested from the image processing device 10. As necessary, an additional external device may be included.

Figure 2:
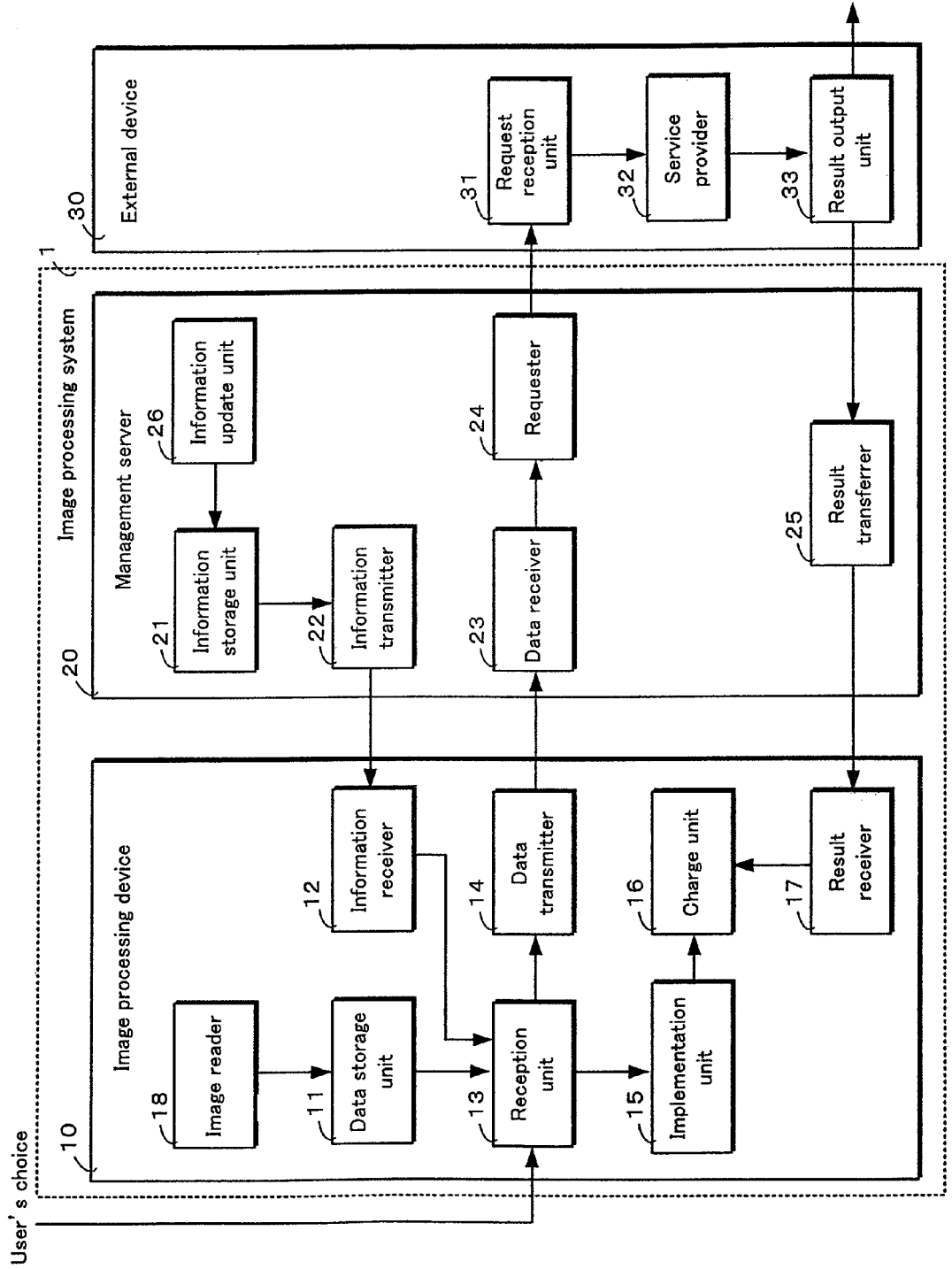
FIG. 2 shows a basic functional configuration of an image processing device 10, a management server 20, and an external device 30 in Embodiment 1.

FIG. 2 shows a basic functional configuration of the image processing device 10, the management server 20, and the external device 30 in Embodiment 1.

The image processing device 10 includes a data storage unit 11, an information receiver 12, a reception unit 13, a data transmitter 14, an implementation unit 15, a charge unit 16, a result receiver 17, and an image reader 18. The management server 20 includes an information storage unit 21, an information transmitter 22, a data receiver 23, a requester 24, a result transferrer 25, and an information update unit 26. And the external device 30 includes a request reception unit 31, a service provider 32, and a result output unit 33.

The data storage unit 11 is comprised of a recording medium for storing the image data transmitted from outside and the image data that the image reader 18 has read from a manuscript. The recording medium is comprised of a hard disc or the like.

The information receiver 12 is comprised of a network interface or the like. The information receiver 12 receives, from the management server 20, (i) list information indicating a list of service identifiers each of which identifies an external service implemented by the external device 30 and an internal service, such as image forming processing, implemented by the image processing device 10, and (ii) pieces of fee information each of which indicates usage fee for each external service or internal service.

The reception unit 13 is comprised of a man-machine interface including a display panel, operation buttons or the like, and hardware like a processor implementing control software. The reception unit 13 displays the list of external service identifiers and internal service identifiers and usage fees therefor based on the list information and the pieces of fee information. The reception unit 13 further receives a selection of an external or internal service identifier from a user, and receives a designation of object image data to be used for the external service or internal service identified by the selected service identifier, and obtains the designated object image data. The object image data is designated from among one or more pieces of image data stored in the data storage unit 11.

Additionally, the reception unit 13 may receive a designation of object image data from pieces of the image data which are not stored in the data storage unit 11 and obtain the designated object image data. For example, the reception unit 13 may receive a designation of object image data from pieces of the image data stored in the external device (it is not limited to the external device 30) and obtain the designated object image data from the external device. Also, the reception unit 13 may receive a designation of object image data from pieces of the image data generated by the image reader 18 and obtain the object image data.

The data transmitter 14 is comprised of a network interface or the like. When the reception unit 13 receives a selection of an external service identifier from a user, and obtains the designated object image data, the data transmitter 14 transmits the external service identifier and the object image data to the management server 20.

The implementation unit 15 is comprised of hardware such as a printer, a scanner, a fax machine, and a processor which operates in accordance with control software. The implementation unit 15 implements an internal service when the reception unit 13 receives a selection of an internal service identifier from a user.

The charge unit 16 (i) specifies, based on pieces of fee information, usage fees, one of which is for an external service and another one of which is for an internal service, and (ii) charges a total of the specified usage fees.

The result receiver 17 is comprised of hardware including a network interface, a hard disc, and a processor which operates in accordance with control software or the like. The result receiver 17 receives processed data from the management server 20.

The image reader 18 is comprised of a scanner and the like. The image reader 18 reads an image from a manuscript and generates image data, and stores the image data in the data storage unit 11.

The information storage unit 21 is comprised of a hard disc or the like. The information storage unit 21 stores the list information and the pieces of fee information.

FIG. 3 shows one example of a table indicating the list information and the pieces of fee information, each of which corresponds to each external or internal service. In the table, a list of external or internal service identifiers included in the column of "service name" corresponds to the list information. Each of the external or internal service identifiers identifies the corresponding external service or internal service. Also, in the table, each usage fee in the column of "price" corresponds to each piece of fee information. Each usage fee indicates a fee per page. And also, in the table, each item included in the column of "connection information" indicates a destination for connection regarding the corresponding external service. The item in the column shown as "--" corresponds to an internal service. The column may also indicate a destination for connection to external device when there is a plurality of external devices.

The information transmitter 22 is comprised of a network interface or the like. The information transmitter 22 transmits the list information and the pieces of fee information stored in the information storage unit 21 to the image processing device 10. Both pieces of the information are transmitted at the time either of the list information and the pieces of fee information is updated or when receiving a request from the image processing device 10. The information transmitter 22 may also periodically transmit both pieces of the information.

The data receiver 23 is comprised of a network interface or the like. The data receiver 23 receives the selected external service identifier and the designated object image data from the image processing device 10.

The requester 24 is comprised of a network interface or the like. The requester 24 transmits, to the external device 30, the selected external service identifier and the object image data both of which were received by the data receiver 23, and requests the external device 30 to implement the external service identified by the external service identifier, by using the object image data.

The result transferrer 25 is comprised of a network interface or the like. The result transferrer 25 receives, from the external device 30, processed data which the external device 30 created by implementing the external service identified by the external service identifier which the requester 24 transmitted.

The information update unit 26 is comprised of a man-machine interface and a processor or the like. The processor operates by implementing, control software. The information update unit 26 receives, from an administrator who manages the management server 20, a request of updating information, and updates the information. The information update unit 26 also updates the list information and the pieces of fee information stored in the information storage unit 21.

The request reception unit 31 receives, from the management server 20, a request for an external service with the external service identifier identifying the external service and the object image data.

The service provider 32 implements the external service identified by the received external service identifier. For example, the service provider 32 implements functionally high grade services like searchable PDF and special image processing services and the like. The service provider 32 implements these services by using the object image data received by the request reception unit 31.

The result output unit 33 outputs, to the management server 20, processed data which was created by implementing the external service identified by the external service identifier with use of the object image data.

<<Control Operation>>

Figure 4:
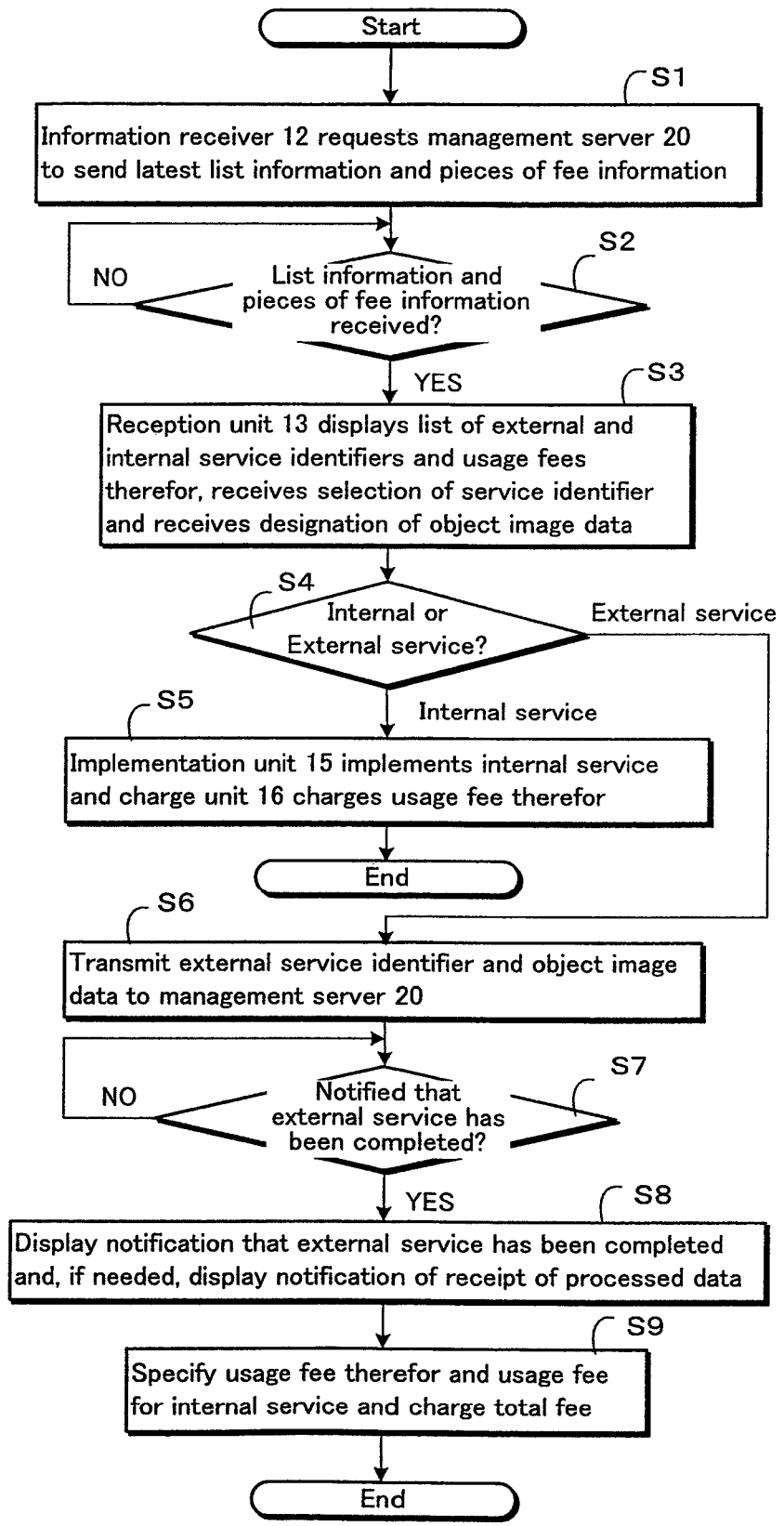
FIG. 4 is a flow chart showing the processing performed by the image processing device 10.

FIG. 4 shows the processing operation performed by the image processing device 10.

(1) The information receiver 12 requests the management server 20 to send latest list information and pieces of fee information. (step S1)

(2) The information receiver 12 waits until it receives the list information and the pieces of fee information from the management server 20. (step S2)

(3) The reception unit 13 displays a list of external and internal service identifiers and usage fees therefor, based on the list information and the pieces of fee information received by the information receiver 12. Also, the reception unit 13 receives, from a user, a selection of an external or internal service identifier from the list, and receives a designation of object image data, from among one or more pieces of image data stored in the data storage unit 11, to be used for the service identified by the selected external or internal service identifier. (step S3)

(4) The reception unit 13 makes a judgment on whether the service identified by the selected service identifier is an internal service or an external service. (step S4)

(5) In the case where the service identified by the selected service identifier is an internal service ("internal service" in step S4), the implementation unit 15 implements the internal service. And the charge unit 16 specifies the usage fee therefor based on the received pieces of fee information, and charges the specified usage fee. (step S5)

(6) In the case where the service received from a user is an external service ("external service" in step S4), the data transmitter 14 transmits the selected external service identifier and the designated object image data to the management server 20. (step S6)

(7) The result receiver 17 waits until it is notified that the external service has been completed. The result receiver 17 may wait until it receives processed data from the external device via the management server 20. (step S7)

(8) When the result receiver 17 is notified that the external service has been completed, it displays the notification to the user. (step S8) The result receiver 17 may display the notification of receipt of the processed data, when the processed data is received.

(9) The charge unit 16 specifies the usage fee therefor based on the received pieces of fee information. In the case where the reception unit 13 receives, from a user, selections of an internal and external service identifier from the list, the charge unit 16 specifies each of the usage fee for the internal service and the usage fee for the external service in step S5 and step S9. Then, the charge unit 16 charges a total of the specified fees. (step S9)

Figure 5:
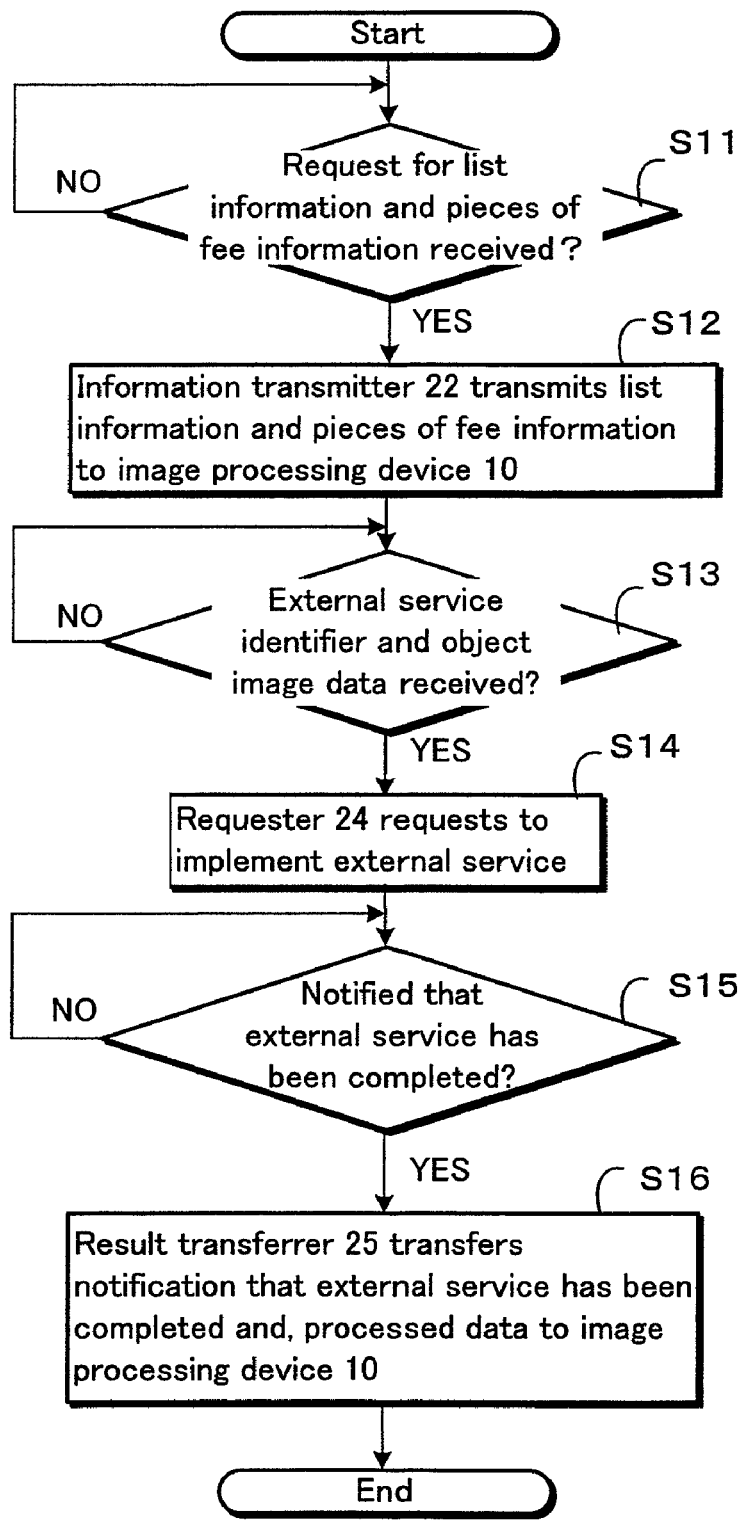
FIG. 5 is a flow chart showing the processing performed by the management server 20.

FIG. 5 shows the processing operation performed by the management server 20.

(1) The information transmitter 22 waits until it receives a request for the list information and the pieces of fee information from the image processing device 10. (step S11)

(2) Upon receiving a request for the list information and the pieces of fee information (YES in step S11), the information transmitter 22 transmits these pieces of information to the image processing device 10. (step S12)

(3) The data receiver 23 waits until it receives the selected external service identifier and the designated object image data. (step S13)

(4) Once the selected external service identifier and the selected object image data are received by the data receiver 23, the requester 24 transmits the received external service identifier and the received object image data to external device 30 and requests to implement the external service identified by the external service identifier by using the received object image data. (step S14)

(5) The result transferrer 25 waits until it is notified that the external service has been completed. The result transferrer 25 may wait until processed data, which the external device 30 created by implementing the external service, is received, from the external device 30. (step S15)

(6) The result transferrer 25 transfers the notification that the external service has been completed and the processed data to the image processing device 10. (step S16)

Summary of Embodiment 1

As described above, Embodiment 1 provides the advantageous effect that it can remove the burden for each user of signing contracts with each service supplier and the like, because external services are mediated by the management server and are used at the image processing device. It provides the further advantageous effect that users' convenience can be improved by eliminating the workload of each user to pay for usage fees respectively to each service supplier. Because the usage fees for both the external and internal services are managed by the management server. As a result, the usage fees for the external and internal services are charged together by the image processing device.

[Modification 1]
<<Outline>>

The image processing system according to Modification 1, charges each user for usage of services, in addition to the configuration in Embodiment 1.
<<Configuration>>

The main components of the image processing system 2 in Modification 1 are identical to those in Embodiment 1 except that the image processing device 10 is replaced by the image processing device 110, and the management server 20 is replaced by the management server 120.

Note that the components which are identical to those in Embodiment 1 are assigned the same numbers and description thereof is omitted.

Figure 6:
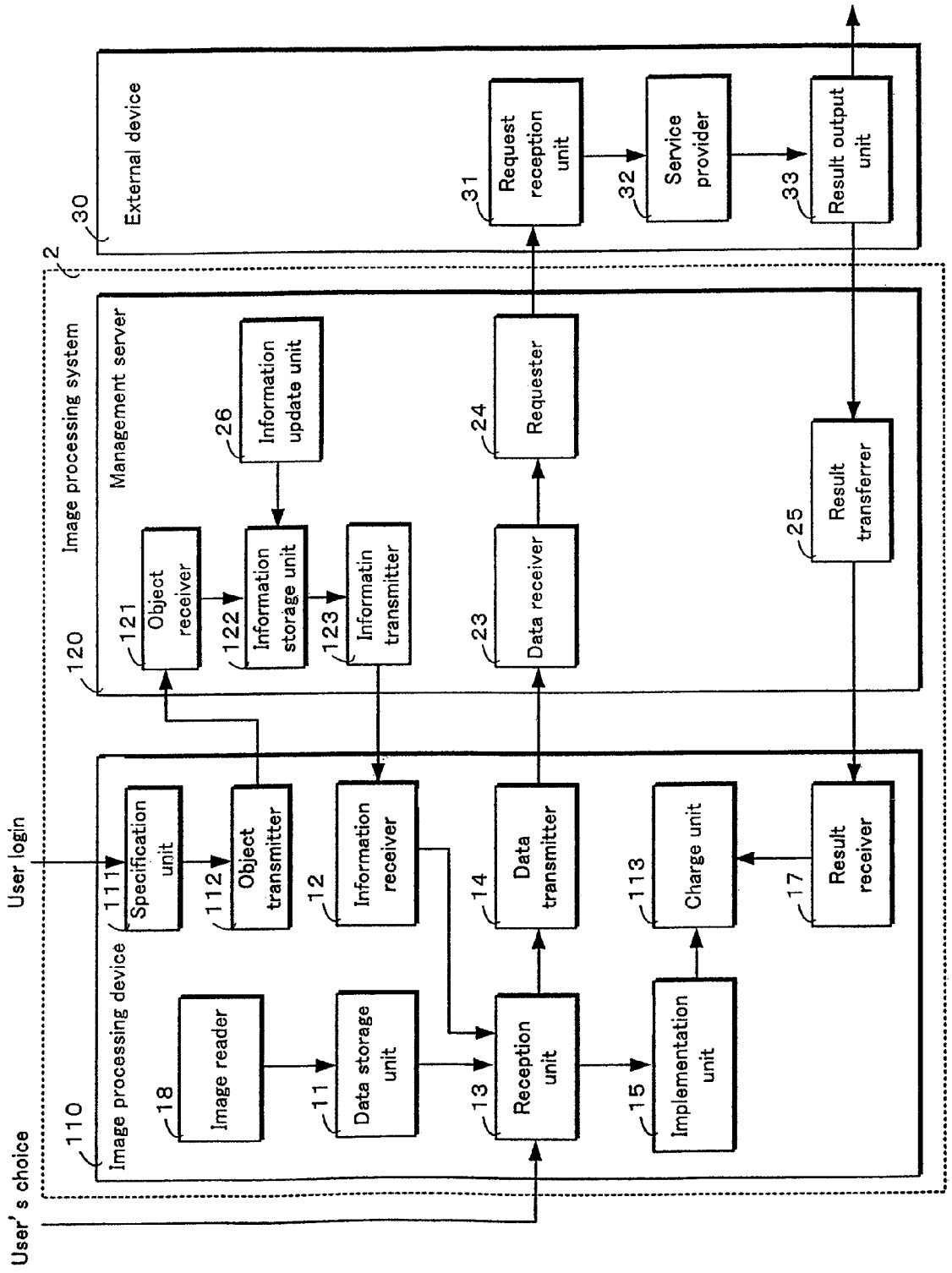
FIG. 6 shows a basic functional configuration of an image processing device 110, a management server 120, and the external device 30 in Modification 1.

FIG. 6 shows a basic functional configuration of the image processing device 110, the management server 120, and the external device 30 in Modification 1.

As shown in FIG. 6, the image processing device 110 includes a specification unit 111, an object transmitter 112, a data storage unit 11, an information receiver 12, a reception unit 13, a data transmitter 14, an implementation unit 15, a charge unit 113, a result receiver 17, and an image reader 18. The management server 120 includes an object receiver 121, an information storage unit 122, an information transmitter 123, a data receiver 23, a requester 24, a result transferrer 25, and an information update unit 26. And the external device 30 includes a request reception unit 31, a service provider 32, and a result output unit 33.

The specification unit 111 specifies a user whom usage fee for services is charged. For example, the specification unit 111 specifies the user by receiving a user identifier through a user login.

The object transmitter 112 transmits the received user identifier to the management server 120.

The charge unit 113 charges the user identified by the received user identifier for the usage fee for the services identified by the external or internal service identifier selected by the user based on the pieces of fee information transmitted from the information transmitter 123.

The object receiver 121 receives the user identifier transmitted from the image processing device 110.

The information storage unit 122 stores the list information and pieces of fee information each of which further corresponds to each user.

FIG. 7 shows one example of a table indicating the list information and the pieces of fee information stored in the information storage unit 122. The table indicates that each user corresponds to each external or internal service and pieces of fee information therefor. Each user identifier in the column of "user" in the table indicates the user identifier identifying the user who is permitted to use the corresponding external or internal service. The table also indicates the usage fees for each external or internal service.

The information transmitter 123 extracts from the pieces of fee information of respective users stored in the information storage unit 122, the piece of fee information which corresponds to the user identified by the user identifier received by the object receiver 121, and transmits the extracted piece of fee information to the image processing device 110.

<<Summary of Modification 1>>

As described above, the system in Modification 1 charges each user for usage of services, and thereby improving users' convenience.

[Modification 2]
<<Outline>>

In Modification 2, an image processing system charges each section for usage of services, in addition to the configuration in Embodiment 1.
<<Configuration>>

The main components of the image processing system 3 in Modification 2 are identical to those in Embodiment 1 except that the image processing device 10 is replaced by the image processing device 210, and the management server 20 is replaced by the management server 220.

Note that the components which are identical to those in Embodiment 1 are assigned the same numbers and description thereof is omitted.

FIG. 8 shows a basic functional configuration of the image processing device 210, the management server 220, and the external device 30 in Modification 2.

As shown in FIG. 8, the image processing device 210 includes a specification unit 211, an object transmitter 212, a data storage unit 11, an information receiver 12, a reception unit 13, a data transmitter 14, an implementation unit 15, a charge unit 213, a result receiver 17, and an image reader 18. The management server 220 includes an object receiver 221, an information storage unit 222, an information transmitter 223, a data receiver 23, a requester 24, a result transferrer 25, and an information update unit 26. And the external device 30 includes a request reception unit 31, a service provider 32, and a result output unit 33.

The specification unit 211 specifies a section which usage fee for services is charged. For example, the specification unit 211 specifies the section by receiving a section identifier through a login from a user.

The object transmitter 212 transmits the received section identifier to the management server 220.

The charge unit 213 charges the section identified by the received section identifier for the usage fee for the services identified by the external or internal service identifier selected by a user based on the pieces of fee information transmitted from the information transmitter 223.

The object receiver 221 receives the section identifier transmitted from the image processing device 210.

The information storage unit 222 stores the list information and pieces of fee information each of which further corresponds to each section.

FIG. 9 shows one example of a table indicating the list information and the pieces of fee information stored in the information storage unit 222. The table indicates that each section identifier in the column of "section" in the table indicates the section identifier identifying the section which is permitted to use the corresponding external service or internal service. The table also indicates the usage fee for each external or internal service.

The information transmitter 223 extracts from the pieces of fee information of respective sections stored in the information storage unit 222, the piece of fee information which corresponds to the section identified by the section identifier received by the object receiver 221, and transmits the extracted piece of fee information to the image processing device 210.

<<Summary of Modification 2>>

As described above, the system in Modification 2 charges each section for usage of services, and thereby improving users' convenience.

[Modification 3]

<<Outline>>

In Modification 3, an image processing system charges each image processing device for usage of services, in addition to the configuration in Embodiment 1.

<<Configuration>>

The main components of the image processing system 4 in Modification 3 are identical to those in Embodiment 1 except that the image processing device 10 is replaced by the image processing device 310A, 310B, and 310C, and the management server 20 is replaced by the management server 320.

Note that the components which are identical to those in Embodiment 1 are assigned the same numbers and description thereof is omitted.

Figure 10:
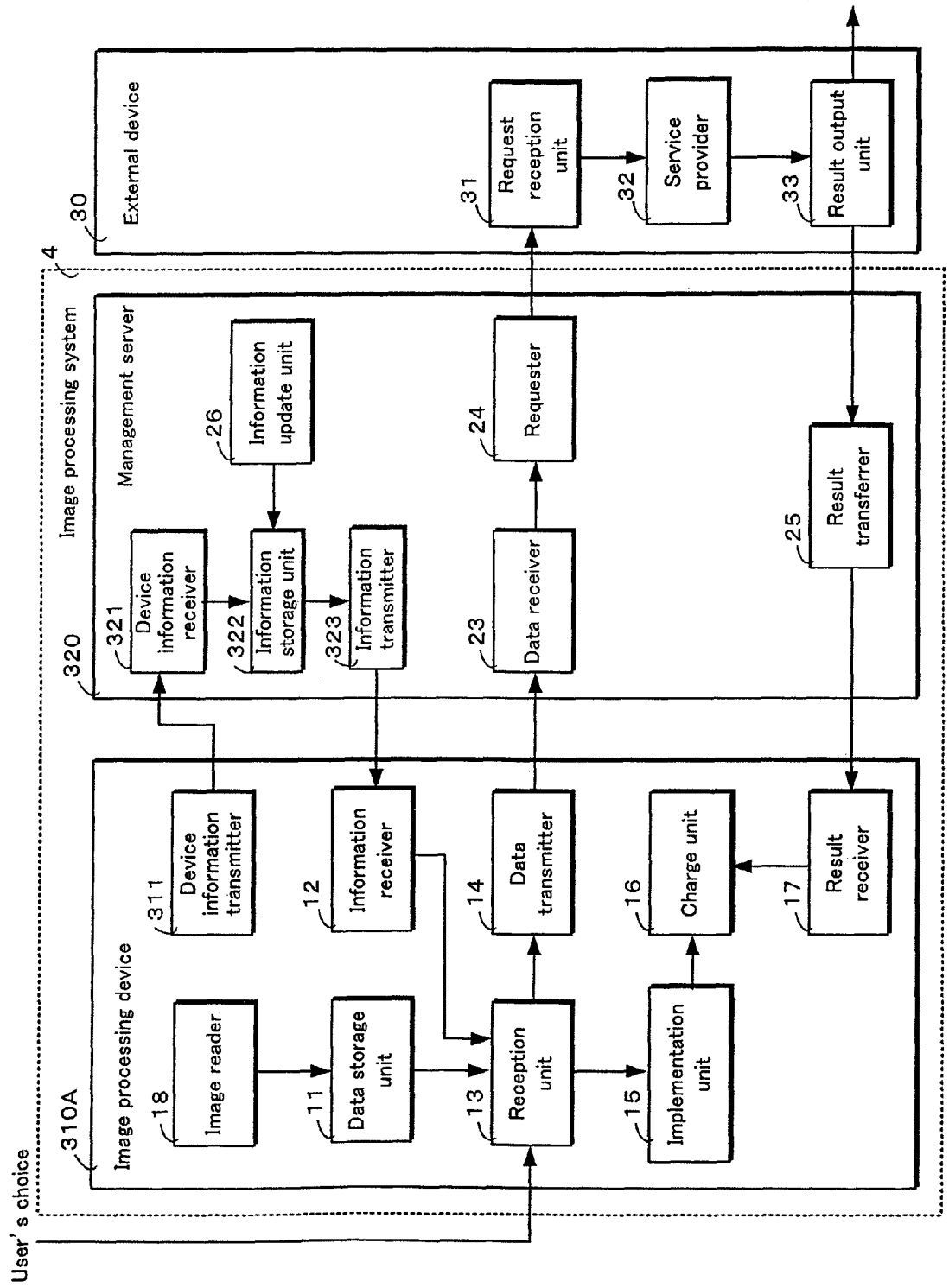
FIG. 10 shows a basic functional configuration of an image processing device 310A, a management server 320, and the external device 30 in Modification 3.

FIG. 10 shows a basic functional configuration of the image processing device 310A, the management server 320, and the external device 30 in Modification 3. Here, the each functional configuration of the image processing device 310B (not shown) and the image processing device 310C (not shown) is identical to the functional configuration of the image processing device 310A.

As shown in FIG. 10, the image processing device 310A includes a device information transmitter 311, a data storage unit 11, an information receiver 12, a reception unit 13, a data transmitter 14, an implementation unit 15, a charge unit 16, a result receiver 17, and an image reader 18. The management server 320 includes a device information receiver 321, an information storage unit 322, an information transmitter 323, a data receiver 23, a requester 24, a result transferrer 25, and an information update unit 26. And the external device 30 includes a request reception unit 31, a service provider 32, and a result output unit 33.

The device information transmitter 311 transmits a device identifier to identify a device itself to the management server 320.

The device information receiver 321 receives the device identifier from the image processing device 310A.

The information storage unit 322 stores the list information and pieces of fee information each of which further corresponds to each image processing device.

FIG. 11 shows one example of a table indicating the list information and the pieces of fee information stored in the information storage unit 322. Each device identifier in the column of "device ID" in the table indicates the device identifier identifying the image processing device which is permitted to use the corresponding external service or internal service. The table also indicates the usage fee for each external or internal service.

The information transmitter 323 extracts from the pieces of fee information of respective image processing devices stored in the information storage unit 322, the piece of fee information which corresponds to the image processing device identified by the device identifier received by the device information receiver 321, and transmits the extracted piece of fee information to the image processing device.

<<Summary of Modification 3>>

As described above, the system in Modification 3 charges each image processing device, and thereby improving users' convenience.

[Modification 4]

<<Outline>>

The following describes an image processing system in Modification 4. There is a restriction to use time for respective services therein, in addition to the configuration in Embodiment 1.

<<Configuration>>

The main components of the image processing system 5 in Modification 4 are identical to those in Embodiment 1 except that the image processing device 10 is replaced by the image processing device 410, and the management server 20 is replaced by the management server 420.

Note that the components which are identical to those in Embodiment 1 are assigned the same numbers and description thereof is omitted.

Figure 12:
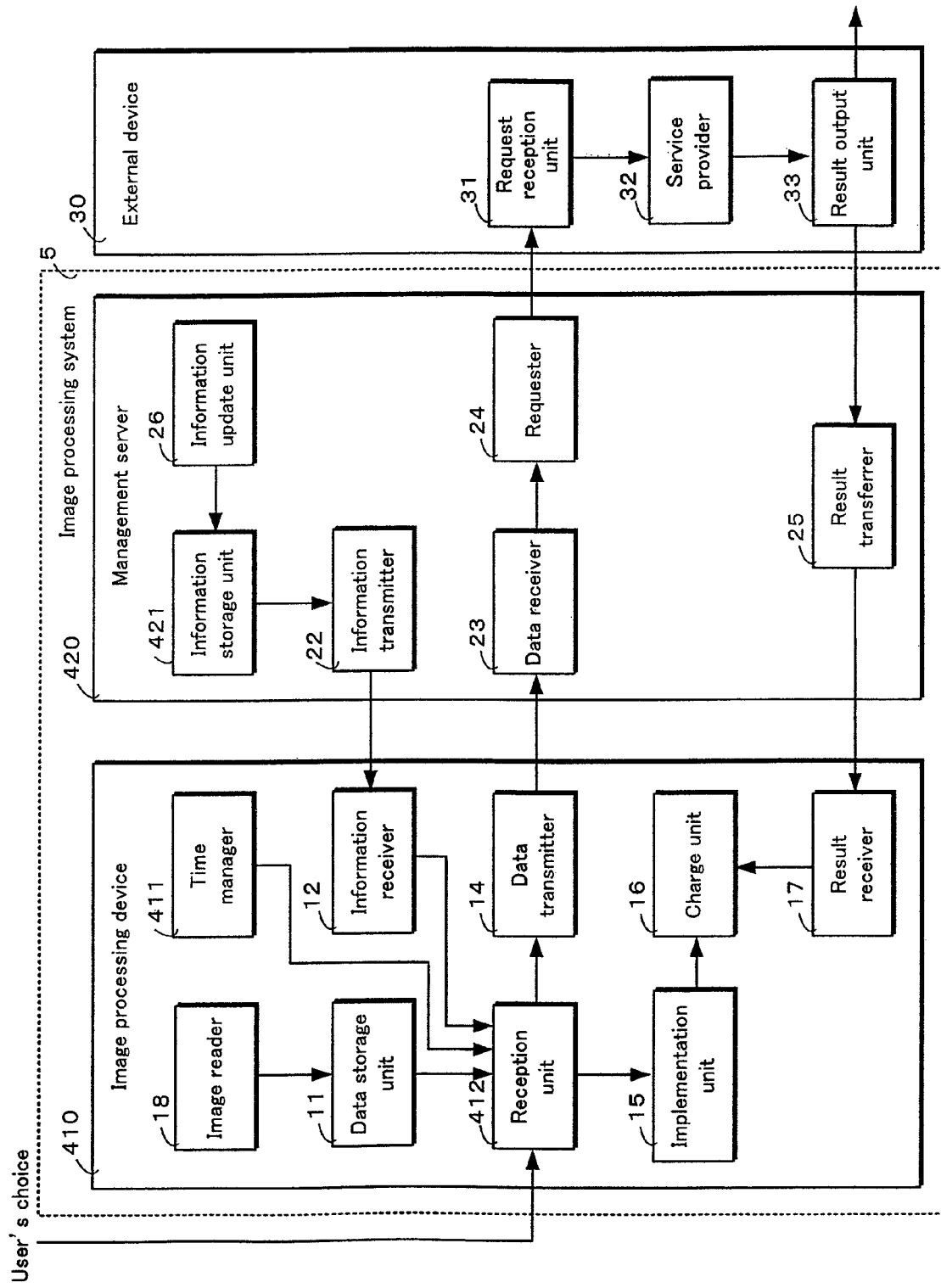
FIG. 12 shows a basic functional configuration of an image processing device 410, a management server 420, and the external device 30 in Modification 4.

FIG. 12 shows a basic functional configuration of the image processing device 410, the management server 420, and the external device 30 in Modification 4.

As shown in FIG. 12, the image processing device 410 includes a time manager 411, a data storage unit 11, an information receiver 12, a reception unit 412, a data transmitter 14, an implementation unit 15, a charge unit 16, a result receiver 17, and an image reader 18. The management server 420 includes an information storage unit 421, an information transmitter 22, a data receiver 23, a requester 24, a result transferrer 25, and an information update unit 26. And the external device 30 includes a request reception unit 31, a service provider 32, and a result output unit 33.

The time manager 411 manages a current time. For example, the time manager 411 can be comprised of an electronic clock or the like.

The information storage unit 421 stores list information and the pieces of fee information in Embodiment 1, and in addition, the list information includes time information corresponding to each service. The time information indicates a period of time during which users are permitted to use the corresponding service.

FIG. 13 shows one example of a table indicating the list information and the pieces of fee information stored in the information storage unit 421. Each period of time in the column of "available time" in the table indicates the period of time during which users may use the corresponding external or internal service.

The reception unit 412 (i) eliminates, from the list, one or more services each of which corresponds to a pieces of time information indicating a period of time in which the current time managed by the time manager 411 is not included, and (ii) displays a list of one or more external or internal services each of which corresponds to a piece of time information indicating a period of time in which the current time managed by the time manager is included. And instead of the operation (i), the reception unit 412 may display a message showing a rejection of selecting one or more external or internal service each of which corresponds to a pieces of time information indicating a period of time in which the current time managed by the time manager 411 is not included.

<<Summary of Modification 4>>

As described above, in Modification 4, it becomes possible to restrict the time to use each service, thereby enabling well-kept operational management.

Furthermore, Embodiment 1, Modification 1, 2, 3, and 4 may be implemented in arbitrary combination with each other.

Also, operations as described in Embodiment 1, Modification 1, 2, 3, and 4 may be realized by a processor operating according to a computer program recorded on a computer-readable recording medium. And the recording medium may be distributed and traded. And further, the program may be distributed and traded via a network or the like, and displayed on a display device or printed.

A computer-readable recording medium here is, for example, a removable recording medium like a floppy disk, a CD, a MO, a DVD and a memory card, or a fixed recording medium like a hard disc and a semiconductor memory.

Summary of Embodiment 1 and Modifications

The above-described embodiment and modifications are based on the aspects of the present invention having been described as solving the problem of the related art. The aspects of the present invention are as follows.

One aspect of the present invention is an image processing system comprising an image processing device and a management server, the image processing device including: an information receiver operable to receive, from the management server, a list of service identifiers each of which identifies a corresponding image processing service which is not available in the image processing device and to be implemented by an external device; a reception unit operable to (i) display the received list, and (ii) receive, from a user, a selection of a service identifier from the list, and a designation of object image data to be used for the image processing service identified by the selected service identifier, and (iii) obtain the designated object image data; a data transmitter operable to transmit the selected service identifier and the designated object image data to the management server, and the management server including: an information storage unit storing the list; an information transmitter operable to transmit the list to the image processing device; a data receiver operable to receive the service identifier and the object image data transmitted from the image processing device; and a requester operable to transmit the received object image data and the received service identifier to the external device, and request to implement the image processing service identified by the received service identifier.

Another aspect of the present invention is the image processing system, wherein the image processing device further includes an image reader operable to read an image from a manuscript and generate image data, and store the image data in the data storage unit.

Other aspect of the present invention is the image processing system, wherein the image processing device further includes an image reader operable to read an image from a manuscript and generate image data, and the receiving unit obtains the image data generated by the image reader as the designated object image data.

Other aspect of the present invention is the image processing device in an image processing system comprising the image processing device and a management server, the image processing device including: an information receiver operable to receive, from the management server, a list of service identifiers each of which identifies a corresponding image processing service which is not available in the image processing device and to be implemented by an external device; a reception unit operable to (i) display the received list, and (ii) receive, from a user, a selection of a service identifier from the list, and a designation of object image data to be used for the image processing service identified by the selected service identifier, and (iii) obtain the designated object image data; and a data transmitter operable to transmit the selected service identifier and the designated object image data to the management server.

Other aspect of the present invention is the management server in an image processing system comprising an image processing device and the management server, the management server including: an information storage unit storing a list of service identifiers each of which identifies a corresponding image processing service which is not available in the image processing device and to be implemented by an external device; an information transmitter operable to transmit the list to the image processing device; a data receiver operable to receive, from the image processing device, the service identifier selected by a user and object image data to be used for the image processing service identified by the selected service identifier; and a requester operable to transmit the received object image data and the received service identifier to the external device, and request to implement the image processing service identified by the received service identifier.

Other aspect of the present invention is an image processing method used for an image processing system comprising an image processing device and a management server, the management server includes information storage medium for storing a list of service identifiers each of which identifies a corresponding image processing service which is not available in the image processing device and to be implemented by an external device, and the image processing method comprising the steps of: transmitting the list stored in the information storage medium to the image processing device, using the management server; receiving the transmitted list, using the image processing device; displaying the received list, receiving, from a user, a selection of a service identifier from the list, and a designation of object image data to be used for the image processing service identified by the selected service identifier, and obtaining the designated object image data, using the image processing device; transmitting the selected service identifier and the designated object image data to the management server, using the image processing device; receiving the transmitted service identifier and the transmitted object image data, using the management server; and requesting the external device to implement the image processing service identified by the received service identifier by transmitting the received object image data and the received service identifier to the external device, using the management server.

Other aspect of the present invention is a computer-readable recording medium recorded with an image processing program for causing an image processing device in an image processing system comprising the image processing device and a management server to perform image processing, the image processing comprising the steps of: receiving, from the management server, a list of service identifiers each of which identifies a corresponding image processing service which is not available in the image processing device and to be implemented by an external device; displaying the received list, receiving, from a user, a selection of a service identifier from the list, and a designation of object image data to be used for the image processing service identified by the selected service identifier, and obtaining the designated object image data; and transmitting the selected service identifier and the designated object image data to the management server.

Other aspect of the present invention is a computer-readable recording medium recorded with a management program for causing a management server in an image processing system comprising an image processing device and the management server to perform management operation, the management server includes information storage medium for storing a list of service identifiers each of which identifies a corresponding image processing service which is not available in the image processing device and to be implemented by an external device, the management operation comprising the steps of: transmitting the list to the image processing device; receiving, from the image processing device, the service identifier selected by a user and object image data to be used for the image processing service identified by the selected service identifier; and requesting the external device to implement the image processing service identified by the received service, identifier by transmitting the received object image data and the received service identifier to the external device.

With the above-stated structure, the above-stated aspects of present invention provide the advantageous effect that it can remove from each user the burden of signing contracts with each service supplier and the like. Because external services are mediated by a management server, each user of an image processing device can use the external service via the management server.

In the above-stated image processing system, the list further includes fee information indicating a usage fee for each image processing service identified by a corresponding service identifier, and the image processing device further includes a charge unit operable to charge a usage fee for the image processing service identified by the selected service identifier based on the fee information included in the received list.

In the above-stated image processing method, the list stored in the information storage medium further includes fee information indicating a usage fee for each image processing service identified by a corresponding service identifier, and the image processing method further comprises the step of charging a usage fee for the image processing service identified by the selected service identifier based on the fee information included in the received list, using the image processing device.

With the above-stated structure, the above-stated aspects of present invention provide the advantageous effect that users' convenience can be improved. That is, because the charging of usage fees is also mediated by the management server, each user does not have to directly pay for usage fees to each service supplier.

In the above-stated image processing system, the image processing device further includes an implementation unit operable to implement internal services which are implemented by the image processing device itself and include image forming processing, the list further includes internal service identifiers each of which identifies a corresponding internal service and fee information indicating a usage fee for each internal service identified by a corresponding internal service identifier, the reception unit further receives a selection of an internal service identifier from the list, and the charge unit further specifies a usage fee for the internal service identified by the selected internal service identifier based on the fee information included in the list, and charges a total of the specified usage fee and the usage fee for the image processing service.

The above-stated image processing method may further comprise the step of implementing internal services which are implemented by the image processing device itself and include image forming processing, using the image processing device, the list further includes internal service identifiers each of which identifies a corresponding internal service and fee information indicating a usage fee for each internal service identified by a corresponding internal service identifier, the receiving step further receives a selection of an internal service identifier from the list, and the charging step further specifies a usage fee for the internal service identified by the selected internal service identifier based on the fee information included in the list, and charges a total of the specified usage fee and the usage fee for the image processing service, using the image processing device.

With the above-stated structure, the above-stated aspects of present invention provide the advantageous effect that users' convenience can be improved. That is, because usage fees for both internal services and external services are charged together, each user does not have to pay for usage fees for internal services and external services separately.

In the above-stated image processing system, the image processing device further includes: an specification unit operable to specify a user by receiving a user identifier from the user; an object identifier transmitter operable to transmit the received user identifier to the management server, and the management server further includes an object identifier receiver operable to receive the user identifier transmitted from the image processing device, the fee information further corresponds to each user, the information transmitter extracts from the fee information included in the list stored in the information storage unit, fee information corresponding to the user identified by the received user identifier, and transmits the extracted fee information to the image processing device, and the charge unit charges the specified user for the usage fee for the image processing service identified by the selected service identifier, based on the extracted fee information transmitted from the management server.

In the above-stated image processing system, the image processing device further includes: an specification unit operable to specify a section by receiving a section identifier from a user; an object identifier transmitter operable to transmit the received section identifier to the management server, and the management server further includes an object identifier receiver operable to receive the section identifier transmitted from the image processing device, the fee information further corresponds to each section, the information transmitter extracts from the fee information included in the list stored in the information storage unit, fee information corresponding to the section identified by the received section identifier, and transmits the extracted fee information to the image processing device, and the charge unit charges the specified section for the usage fee for the image processing service identified by the selected service identifier, based on the extracted fee information transmitted from the management server.

The above-stated image processing method may further comprise the steps of: specifying a user by receiving a user identifier from a user, using the image processing device; transmitting the received user identifier to the management server, using the image processing device; receiving the transmitted user identifier, using the management server, the fee information further corresponds to each user, the information transmitting step extracts from the fee information included in the list stored in the information storage medium, fee information corresponding to the user identified by the received user identifier, and transmits the extracted fee information to the image processing device, using the management server, and the charging step charges the specified user for the usage fee for the image processing service identified by the selected service identifier, based on the extracted fee information transmitted from the management server, using the image processing device.

The above-stated image processing method may further comprise the steps of: specifying a section by receiving a section identifier from a user, using the image processing device; transmitting the received section identifier to the management server, using the image processing device; and receiving the transmitted section identifier, using the management server, the fee information further corresponds to each section, the information transmitting step extracts from the fee information included in the list stored in the information storage medium, fee information corresponding to the section identified by the received section identifier, and transmits the extracted fee information to the image processing device, using the management server, and the charging step charges the specified section for the usage fee for the image processing service identified by the selected service identifier, based on the extracted fee information transmitted from the management server, using the image processing device.

With the above-stated structure, the above-stated aspects of present invention provide the advantageous effect that users' convenience can be improved by charging for respective users or sections.

The above-stated image processing system may include a plurality of image processing devices, each of the image processing devices further includes a device identifier transmitter operable to transmit a device identifier of a device itself to the management server, and the management server further includes a device identifier receiver operable to receive the device identifier transmitted from the image processing device, the fee information further corresponds to each image processing device, and the information transmitter extracts from the fee information included in the list stored in the information storage unit, fee information corresponding to the image processing device identified by the received device identifier, and transmits the extracted fee information to the image processing device.

In the above-stated image processing method, the image processing system includes a plurality of image processing devices, the image processing method further comprising the steps of: transmitting a device identifier of a device itself to the management server, using the image processing device; receiving the transmitted device identifier, using the management server, the fee information further corresponds to each image processing device, and the information transmitting step extracts from the fee information included in the list stored in the information storage medium, fee information corresponding to the image processing device identified by the received device identifier, and transmits the extracted fee information to the image processing device, using the management server.

With the above-stated structure, the above-stated aspects of present invention provide the advantageous effect that users' convenience can be improved by charging for respective image processing devices.

In the above-stated image processing system, the image processing device further includes a time manager operable to manage a current time, the list stored in the information storage unit includes a plurality of pieces of time information indicating available periods of time during which users are permitted to use services, the plurality of pieces of time information corresponding one to one to the image processing services, and the reception unit (i) eliminates, from the list, one or more image processing services each of which corresponds to a piece of time information indicating a period of time in which the current time managed by the time manager is not included, and (ii) displays a list of one or more image processing services each of which corresponds to a piece of time information indicating a period of time in which the current time managed by the time manager is included.

In the above-stated image processing system, the image processing device further includes a time manager operable to manage a current time, the list stored in the information storage unit includes a plurality of pieces of time information indicating available periods of time during which users are permitted to use services, the plurality of pieces of time information corresponding one to one to the image processing services, and the reception unit (i) displays a list of one or more image processing services each of which corresponds to a piece of time information indicating a period of time in which the current time managed by the time manager is included, and (ii) displays a message showing a rejection of selecting one or more image processing services each of which corresponds to a piece of time information indicating a period of time in which the current time managed by the time manager is not included.

The above-stated image processing method may further comprise the step of managing a current time, using the image processing device, the list stored in the information storage medium includes a plurality of pieces of time information indicating available periods of time during which users are permitted to use services, the plurality of pieces of time information corresponding one to one to the image processing services, and the receiving step (i) eliminates, from the list, one or more image processing services each of which corresponds to a piece of time information indicating a period of time in which the current time managed by the time manager is not included, and (ii) displays a list of one or more image processing services each of which corresponds to a piece of time information indicating a period of time in which the current time-managed by the time manager is included.

The above-stated image processing method may further comprise the step of managing a current time, using the image processing device, the list stored in the information storage medium includes a plurality of pieces of time information indicating available periods of time during which users are permitted to use services, the plurality of pieces of time information corresponding one to one to the image processing services, and the receiving step (i) displays a list of one or more image processing services each of which corresponds to a piece of time information indicating a period of time in which the current time managed by the time manager is included, and (ii) displays a message showing a rejection of selecting one or more image processing services each of which corresponds to a piece of time information indicating a period of time in which the current time managed by the time manager is not included.

With the above-stated structure, it is possible to restrict the time to use each service, thereby enabling well-kept management of services implemented by external device.

In the above-stated image processing system, the management server further includes a result transferrer operable to receive, from the external device, processed data of the object image data which was obtained by implementing the selected image processing service in the external device, and transfers the processed data to the image processing device, and the image processing device further includes a result receiver operable to receive the processed data from the management server.

The above-stated image processing method may further comprise the steps of: receiving, from the external device, processed data of the object image data which was obtained by implementing the selected image processing service in the external device, and transferring the processed data to the image processing device, using the management server; and receiving the processed data from the management server, using the image processing device.

With the above-stated structure, it is possible to receive processed data and then provide the processed data to a user.

In the above-stated image processing system, the image processing device further includes a data storage unit storing pieces of image data, and the reception unit receives a designation of object image data to be used for the selected image processing service from pieces of the image data stored in the data storage unit.

In the above-stated image processing method, the image processing device further includes an image storage medium for storing pieces of image data, and the receiving step receives a designation of object image data to be used for the selected image processing service from pieces of the image data stored in the image storage medium.

With the above-stated structure, it is possible to designate object image data from pieces of the image data stored in the data storage unit.

In the above-stated image processing system, the image processing device further includes an image reader operable to read an image from a manuscript and generate image data, and store the image data in the data storage unit.

The above-stated image processing method may further comprise the step of reading an image from a manuscript and generating image data, and storing the image data in the image storage medium, using the image processing device.

With the above-stated structure, it is possible to use the image data which was read from the manuscript and stored in the data storage unit as an object image data, and receive an external service in which the image data was used.

In the above-stated image processing system, the image processing device further includes an image reader operable to read an image from a manuscript and generate image data, and the receiving unit obtains the image data generated by the image reader as the designated object image data.

The above-stated image processing method may further comprise the step of reading an image from a manuscript and generating image data, using the image processing device, and the receiving step obtains the image data generated by the image reading step as the designated object image data, using the image processing device.

With the above-stated structure, it is possible to use, as an object image data, the image data which was generated by being read from the manuscript and receive an external service in which the generated image data was used.

INDUSTRIAL APPLICABILITY

The present invention is broadly applicable to a technical field of an image forming device.

The present invention has extremely high industrial applicability, because it can removes from users the burden of sighing contracts with each service supplier or the like and significantly improves the users' convenience.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing system comprising an image processing device and a management server,
    the image processing device including:
    an information receiver operable to receive, from the management server, a list of service identifiers each of which identifies a corresponding image processing service which is not available in the image processing device and to be implemented by an external device;
    a reception unit operable to (i) display the received list, and (ii) receive, from a user, a selection of a service identifier from the list, and a designation of object image data to be used for the image processing service identified by the selected service identifier, and (iii) obtain the designated object image data;
    a data transmitter operable to transmit the selected service identifier and the designated object image data to the management server, and
    the management server including:
    an information storage unit storing the list;
    an information transmitter operable to transmit the list to the image processing device;
    a data receiver operable to receive the service identifier and the object image data transmitted from the image processing device;
    a requester operable to transmit the received service identifier and the received object image data to the external device, and request to implement the image processing service identified by the received service identifier; and
    a result transferrer operable to receive, from the external device, processed data of the object image data which was obtained by implementing the selected image processing service in the external device, and transfers the processed data to the image processing device.

2. The image processing system of claim 1, wherein
    the list further includes fee information indicating a usage fee for each image processing service identified by a corresponding service identifier, and
    the image processing device further includes
    a charge unit operable to charge a usage fee for the image processing service identified by the selected service identifier based on the fee information included in the received list.

3. The image processing system of claim 2, wherein
    the image processing device further includes
    an implementation unit operable to implement internal services which are implemented by the image processing device itself and include image forming processing,
    the list further includes internal service identifiers each of which identifies a corresponding internal service and fee information indicating a usage fee for each internal service identified by a corresponding internal service identifier, the reception unit further receives a selection of an internal service identifier from the list, and the charge unit further specifies a usage fee for the internal service identified by the selected internal service identifier based on the fee information included in the list, and charges a total of the specified usage fee and the usage fee for the image processing service.

4. The image processing system of claim 2, wherein
the image processing device further includes:
an specification unit operable to specify a user by receiving a user identifier from the user;
an object identifier transmitter operable to transmit the received user identifier to the management server, and
the management server further includes
an object identifier receiver operable to receive the user identifier transmitted from the image processing device,
the fee information further corresponds to each user,
the information transmitter extracts from the fee information included in the list stored in the information storage unit, fee information corresponding to the user identified by the received user identifier, and transmits the extracted fee information to the image processing device, and
the charge unit charges the specified user for the usage fee for the image processing service identified by the selected service identifier, based on the extracted fee information transmitted from the management server.

5. The image processing system of claim 2, wherein
the image processing device further includes:
an specification unit operable to specify a section by receiving a section identifier from a user;
an object identifier transmitter operable to transmit the received section identifier to the management server, and
the management server further includes
an object identifier receiver operable to receive the section identifier transmitted from the image processing device,
the fee information further corresponds to each section,
the information transmitter extracts from the fee information included in the list stored in the information storage unit, fee information corresponding to the section identified by the received section identifier, and transmits the extracted fee information to the image processing device, and
the charge unit charges the specified section for the usage fee for the image processing service identified by the selected service identifier, based on the extracted fee information transmitted from the management server.

6. The image processing system of claim 2 may include a plurality of image processing devices,
each of the image processing devices further includes a device identifier transmitter operable to transmit a device identifier of a device itself to the management server, and
the management server further includes
a device identifier receiver operable to receive the device identifier transmitted from the image processing device,
the fee information further corresponds to each image processing device, and
the information transmitter extracts from the fee information included in the list stored in the information storage unit, fee information corresponding to the image processing device identified by the received device identifier, and transmits the extracted fee information to the image processing device.

7. The image processing system of claim 1, wherein
the image processing device further includes
a time manager operable to manage a current time,
the list stored in the information storage unit includes a plurality of pieces of time information indicating available periods of time during which users are permitted to use services, the plurality of pieces of time information corresponding one to one to the image processing services, and
the reception unit (i) eliminates, from the list, one or more image processing services each of which corresponds to a piece of time information indicating a period of time in which the current time managed by the time manager is not included, and (ii) displays a list of one or more image processing services each of which corresponds to a piece of time information indicating a period of time in which the current time managed by the time manager is included.

8. The image processing system of claim 1, wherein
the image processing device further includes
a time manager operable to manage a current time,
the list stored in the information storage unit includes a plurality of pieces of time information indicating available periods of time during which users are permitted to use services, the plurality of pieces of time information corresponding one to one to the image processing services, and
the reception unit (i) displays a list of one or more image processing services each of which corresponds to a piece of time information indicating a period of time in which the current time managed by the time manager is included, and (ii) displays a message showing a rejection of selecting one or more image processing services each of which corresponds to a piece of time information indicating a period of time in which the current time managed by the time manager is not included.

9. The image processing system of claim 1, wherein
the image processing device further includes
a result receiver operable to receive the processed data from the management server.

10. The image processing system of claim 1, wherein
the image processing device further includes
a data storage unit storing pieces of image data, and
the reception unit receives a designation of object image data to be used for the selected image processing service from pieces of the image data stored in the data storage unit.

11. The image processing system of claim 10, wherein
the image processing device further includes
an image reader operable to read an image from a manuscript and generate image data, and store the image data in the data storage unit.

12. The image processing system of claim 1, wherein
the image processing device further includes
an image reader operable to read an image from a manuscript and generate image data, and
the reception unit obtains the image data generated by the image reader as the designated object image data.

13. An image processing device in an image processing system comprising the image processing device and a management server,
the image processing device including:
an information receiver operable to receive, from the management server, a list of service identifiers each of which identifies a corresponding image processing service which is not available in the image processing device and to be implemented by an external device;

a reception unit operable to (i) display the received list, and (ii) receive, from a user, a selection of a service identifier from the list, and a designation of object image data to be used for the image processing service identified by the selected service identifier, and (iii) obtain the designated object image data;

a data transmitter operable to transmit the selected service identifier and the designated object image data to the management server; and a result receiver operable to receive, from the management server, the processed data of the object image data which was obtained by implementing the selected image processing service in the external device.

14. A management server in an image processing system comprising an image processing device and the management server, the management server including:

an information storage unit storing a list of service identifiers each of which identifies a corresponding image processing service which is not available in the image processing device and to be implemented by an external device;

an information transmitter operable to transmit the list to the image processing device;

a data receiver operable to receive, from the image processing device, the service identifier selected by a user and object image data to be used for the image processing service identified by the selected service identifier;

a requester operable to transmit the received object image data and the received service identifier to the external device, and request to implement the image processing service identified by the received service identifier; and a result transferrer operable to receive, from the external device, processed data of the object image data which was obtained by implementing the selected image processing service in the external device, and operable to transfer the processed data to the image processing device.

15. An image processing method used for an image processing system comprising an image processing device and a management server, the management server includes information storage medium for storing a list of service identifiers each of which identifies a corresponding image processing service which is not available in the image processing device and to be implemented by an external device, and the image processing method comprising the steps of:

transmitting the list stored in the information storage medium to the image processing device, using the management server;

receiving the transmitted list, using the image processing device;

displaying the received list, receiving, from a user, a selection of a service identifier from the list, and a designation of object image data to be used for the image processing service identified by the selected service identifier, and obtaining the designated object image data, using the image processing device;

transmitting the selected service identifier and the designated object image data to the management server, using the image processing device;

receiving the transmitted service identifier and the transmitted object image data, using the management server;

requesting the external device to implement the image processing service identified by the received service identifier by transmitting the received object image data, and the received service identifier to the external device, using the management server;

receiving, from the external device, processed data of the object image data which was obtained by implementing the selected image processing service on the object image data in the external device, using the management server; and transferring the processed data of the object image data to the image processing device, using the management server.

16. The image processing method of claim 15, wherein the list stored in the information storage medium further includes fee information indicating a usage fee for each image processing service identified by a corresponding service identifier, and the image processing method further comprising the step of charging a usage fee for the image processing service identified by the selected service identifier based on the fee information included in the received list, using the image processing device.

17. The image processing method of claim 16 further comprising the step of implementing internal services which are implemented by the image processing device itself and include image forming processing, using the image processing device, the list further includes internal service identifiers each of which identifies a corresponding internal service and fee information indicating a usage fee for each internal service identified by a corresponding internal service identifier, the receiving step further receives a selection of an internal service identifier from the list, and the charging step further specifies a usage fee for the internal service identified by the selected internal service identifier based on the fee information included in the list, and charges a total of the specified usage fee and the usage fee for the image processing service, using the image processing device.

18. The image processing method of claim 16 further comprising the steps of:

specifying a user by receiving a user identifier from a user, using the image processing device;

transmitting the received user identifier to the management server, using the image processing device;

receiving the transmitted user identifier, using the management server, the fee information further corresponds to each user, the information transmitting step extracts from the fee information included in the list stored in the information storage medium, fee information corresponding to the user identified by the received user identifier, and transmits the extracted fee information to the image processing device, using the management server, and the charging step charges the specified user for the usage fee for the image processing service identified by the selected service identifier, based on the extracted fee information transmitted from the management server, using the image processing device.

19. The image processing method of claim 16 further comprising the steps of:

specifying a section by receiving a section identifier from a user, using the image processing device;

transmitting the received section identifier to the management server, using the image processing device; and
receiving the transmitted section identifier, using the management server,
the fee information further corresponds to each section,
the information transmitting step extracts from the fee information included in the list stored in the information storage medium, fee information corresponding to the section identified by the received section identifier, and transmits the extracted fee information to the image processing device, using the management server, and
the charging step charges the specified section for the usage fee for the image processing service identified by the selected service identifier, based on the extracted fee information transmitted from the management server, using the image processing device.

20. The image processing method of claim 16, wherein
the image processing system includes a plurality of image processing devices,
the image processing method further comprising the steps of:
transmitting a device identifier of a device itself to the management server, using the image processing device;
receiving the transmitted device identifier, using the management server,
the fee information further corresponds to each image processing device, and
the information transmitting step extracts from the fee information included in the list stored in the information storage medium, fee information corresponding to the image processing device identified by the received device identifier, and transmits the extracted fee information to the image processing device, using the management server.

21. The image processing method of claim 15 further comprising the step of
managing a current time, using the image processing device,
the list stored in the information storage medium includes a plurality of pieces of time information indicating available periods of time during which users are permitted to use services, the plurality of pieces of time information corresponding one to one to the image processing services, and
the receiving step (i) eliminates, from the list, one or more image processing services each of which corresponds to a piece of time information indicating a period of time in which the current time managed by the time manager is not included, and (ii) displays a list of one or more image processing services each of which corresponds to a piece of time information indicating a period of time in which the current time managed by the time manager is included.

22. The image processing method of claim 15 further comprising the step of
managing a current time, using the image processing device,
the list stored in the information storage medium includes a plurality of pieces of time information indicating available periods of time during which users are permitted to use services, the plurality of pieces of time information corresponding one to one to the image processing services, and
the receiving step (i) displays a list of one or more image processing services each of which corresponds to a piece of time information indicating a period of time in which the current time managed by the time manager is included, and (ii) displays a message showing a rejection of selecting one or more image processing services each of which corresponds to a piece of time information indicating a period of time in which the current time managed by the time manager is not included.

23. The image processing method of claim 15, wherein
the image processing device further includes an image storage medium storing pieces of image data, and
the receiving step receives a designation of object image data to be used for the selected image processing service from pieces of the image data stored in the image storage medium.

24. The image processing method of claim 23 further comprising the step of
reading an image from a manuscript and generating image data, and storing the image data in the image storage medium, using the image processing device.

25. The image processing method of claim 15 further comprising the step of
reading an image from a manuscript and generating image data, using the image processing device, and
the receiving step obtains the image data generated by the image reading step as the designated object image data, using the image processing device.

26. A non-transitory computer-readable recording medium recorded with an image processing program for causing an image processing device in an image processing system comprising the image processing device and a management server to perform image processing,
the image processing comprising the steps of:
receiving, from the management server, a list of service identifiers each of which identifies a corresponding image processing service which is not available in the image processing device and to be implemented by an external device;
displaying the received list, receiving, from a user, a selection of a service identifier from the list, and a designation of object image data to be used for the image processing service identified by the selected service identifier, and obtaining the designated object image data;
transmitting the selected service identifier and the designated object image data to the management server; and
receiving, from the management server, processed data of the object image data which was obtained by implementing the selected image processing service in the external device.

27. A non-transitory computer-readable recording medium recorded with a management program for causing a management server in an image processing system comprising an image processing device and the management server to perform management operation,
the management server includes information storage medium for storing a list of service identifiers each of which identifies a corresponding image processing service which is not available in the image processing device and to be implemented by an external device,
the management operation comprising the steps of:
transmitting the list to the image processing device; receiving, from the image processing device, the service identifier selected by a user and object image data to be used for the image processing service identified by the selected service identifier; and
requesting the external device to implement the image processing service identified by the received service identifier by transmitting the received object image data and the received service identifier to the external device;

receiving, from the external device, processed data of the object image data which was obtained by implementing the selected image processing service in the external device; and transferring the processed data to the image processing device.

* * * * *